United States Patent [19]

Shima et al.

[11] 4,294,120
[45] Oct. 13, 1981

[54] TORSIONAL VIBRATION MONITORING APPARATUS FOR ROTATING SHAFT SYSTEM

[76] Inventors: Ichiji Shima; Tatsuo Yamamoto; Shigeru Yoshibayashi; Hiroshi Teshima, all c/o The Kansai Electric Power Co., Inc., Technical Research Center of 2, Ichinotsubo 1-chome, Wakaoji, Amagasaki City, Osaka; Akio Hizume, 8-11, Naka-machi, 1-chome, Setagaya-ku, Tokyo; Tetsuo Iki, 1998-5, Yokoo-machi, Nagasaki City, Nagasaki Pref.; Takashi Yamamoto, 347, Motomurago, Tokitsu-cho, Nishisonogi-gun, Nagasaki Pref.; Kyozo Kanamori, 16-10, Shiraiwa-cho, Isahaya City, Nagasaki Pref.; Shigeho Tanaka, 39-27, Hokuyo-machi, Nagasaki City, Nagasaki Pref., all of Japan

[21] Appl. No.: 46,913

[22] Filed: Jun. 8, 1979

[30] Foreign Application Priority Data

Jun. 8, 1978 [JP] Japan ..................... 53-69048

[51] Int. Cl.$^3$ .................. G01N 29/04; G01H 1/10
[52] U.S. Cl. ........................................... 73/650
[58] Field of Search ........................................ 73/650

[56] References Cited

U.S. PATENT DOCUMENTS 4,051,427  9/1977  Kilgore et al. .................... 73/650

Primary Examiner—Anthony V. Ciarlante
Attorney, Agent, or Firm—Toren, McGeady and Stanger

[57] ABSTRACT

An apparatus for monitoring torsional vibrations of a rotating shaft system such as for a turbine generator in which torsional vibrations at certain positions of the rotating shaft system are detected by detectors and the detected vibrations are converted into torsional vibration at an arbitrary position of the rotating shaft system by using an operation device having desired transfer characteristics, said arbitrary position is monitored on torsional vibration on the basis of the converted torsional vibration.

3 Claims, 8 Drawing Figures

FIG. 2
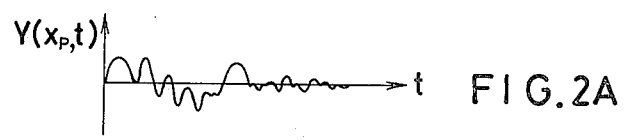
FIG. 2A
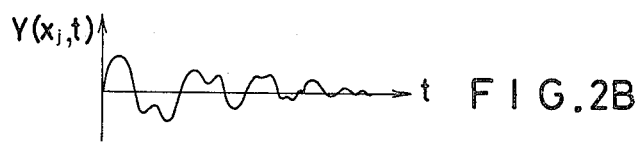
FIG. 2B
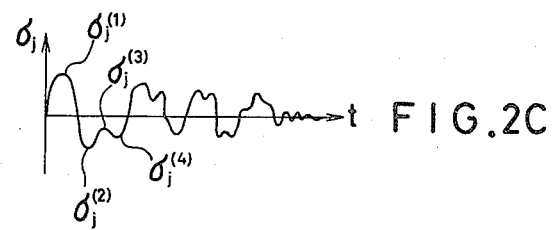
FIG. 2C

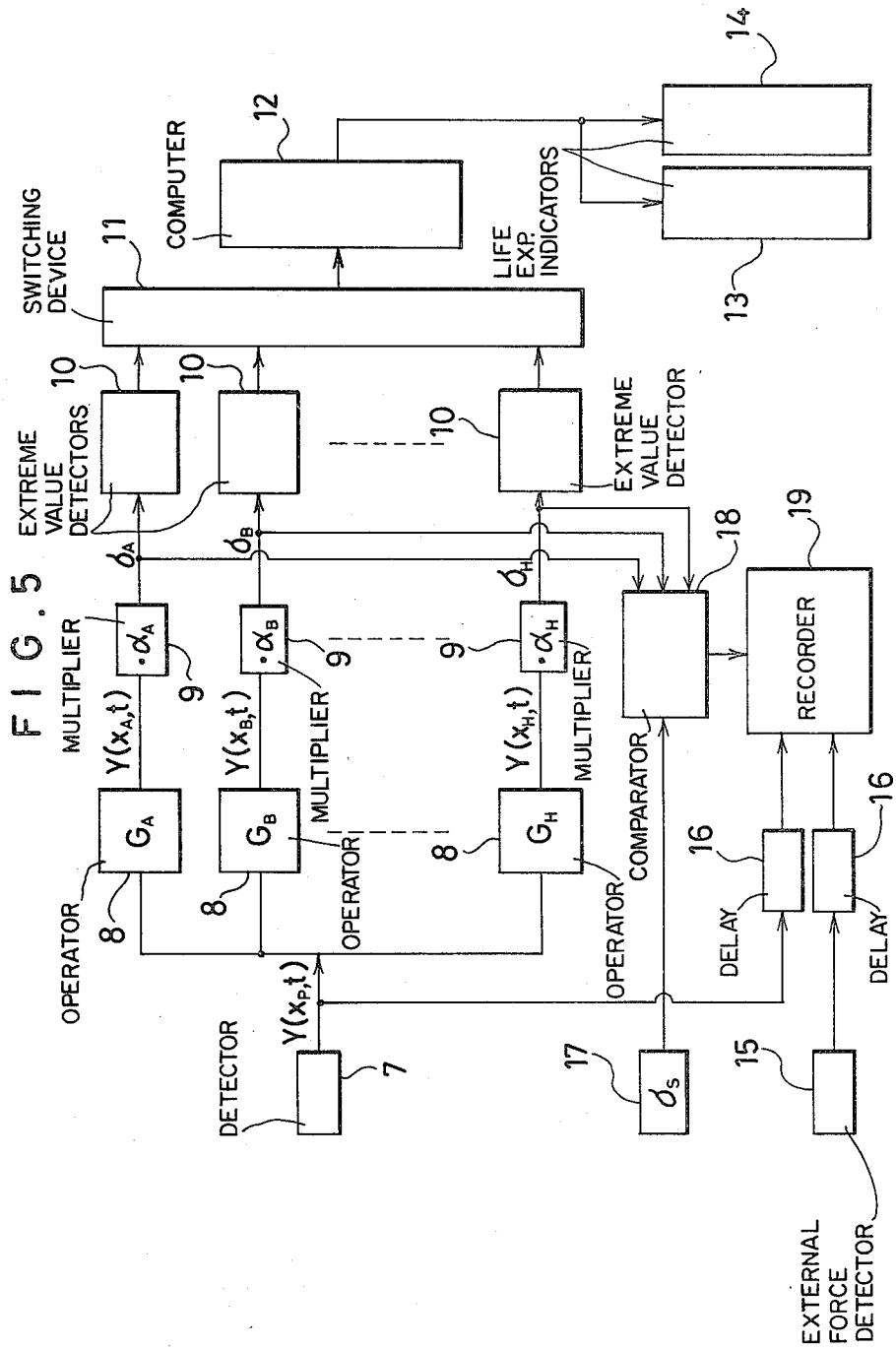

TORSIONAL VIBRATION MONITORING APPARATUS FOR ROTATING SHAFT SYSTEM

BACKGROUND OF THE INVENTION

1. Field of the Invention

The present invention relates to an apparatus for monitoring torsional vibration of a rotating shaft system for such as turbine generator, in which torsional vibrations produced in the rotating shaft system are measured at measurable positions thereof and the measured vibrations are decomposed linearly to estimate torsional vibration at an arbitrary position of the rotating shaft system and thereby monitor the rotating shaft system.

2. Description of the Prior Art

It has been commonly recognized that, in designing a rotating shaft system such as turbine generator, compressor or marine diesel engine, it is important to know exactly various disturbances affecting the rotating shaft system. Particularly, it is very important for operators of the rotating shaft system to know the fatigue life expenditure of the rotating shaft system which may vary with the disturbances.

Since, however, the length of the rotating shaft system of, for example, the turbine generator is generally very long and may become several tens of meters in some cases, it is necessary to set a number of measuring positions along the rotating shaft system. This makes monitoring of the shaft system very difficult. Furthermore, it is well known that torsional vibrations occurring along the rotating shaft system must be measured because such vibrations may fatigue and damages the shaft system. However, it is disadvantageous economically to install torsional vibration measuring devices at a large number of positions on and along the rotating shaft system and it is sometimes impossible physically to do so.

SUMMARY OF THE INVENTION

The present invention is intended to overcome the disadvantages inherent to the conventional torsional vibration monitoring apparatus and an object of the present invention is to monitor a rotating shaft system by estimating torsional vibrations at arbitrary positions of the rotating shaft system on the basis of torsional vibrations of the shaft system measured at certain positions.

In order to achieve the above object, the present invention comprises a detector for transient torsional vibration of shaft for detecting the torsional vibrations of the rotating shaft system at certain position thereof, and an operator having a transfer characteristics suitable to convert the torsional vibration detected at the certain position into torsional vibration at the arbitrary position.

Other objects and features of the present invention will be understood more clearly by the following description with reference to the attached drawings.

BRIEF DESCRIPTION OF THE DRAWING

FIG. 2 shows various waveforms of the torsional vibration occurring in the rotating shaft system, in which FIG. 2A is a torsional vibration waveform at a certain position P, FIG. 2B is a torsional vibration waveform at an arbitrary position to be monitored and FIG. 2C shows a stress waveform at the arbitrary position to be monitored, FIG. 5 is a block diagram of an embodiment of the present invention.

DESCRIPTION OF THE PREFERRED EMBODIMENTS:

Now, the present invention will be described with reference to FIGS. 1 through 5.

According to the knowledges of the vibrograply, a torsional vibration $Y(x,t)$ of a rotating shaft system can be represented by a sum of modal vibrations $Y_i(x,t)$ and each modal vibration can be represented by a product of vibration mode types $g_i(x)$ and vibration mode component $h_i(t)$. That is as follows:

$$Y(x,t) = \Sigma Y_i(x,t) \tag{1}$$
$$= \Sigma g_i(x) \cdot h_i(t) \tag{2}$$

Figure 1:
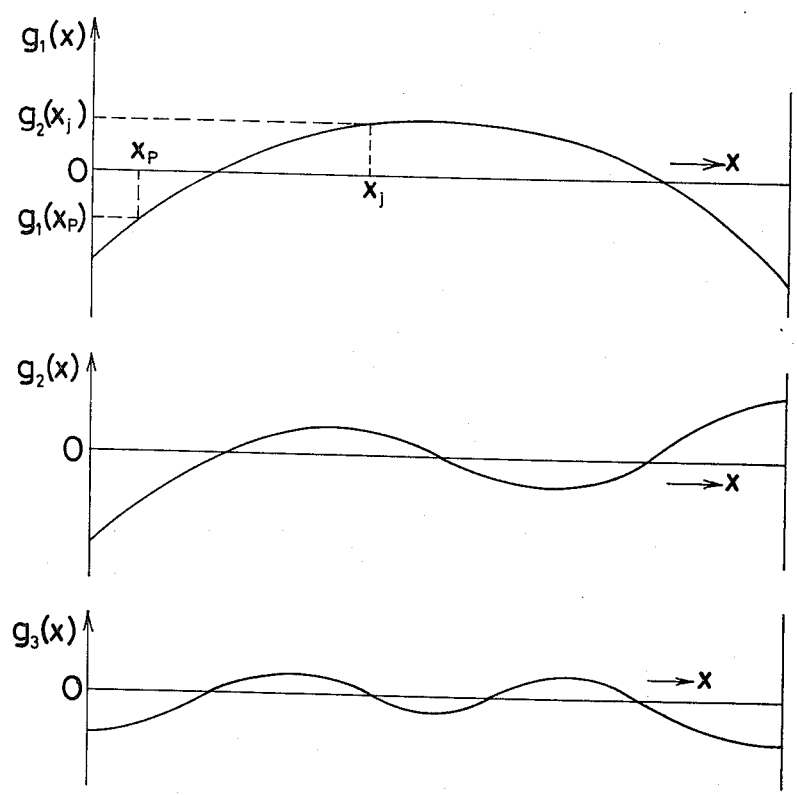
FIG. 1 is an explanatory graph of torsional vibration mode type of a rotating shaft system.
Figure 3:
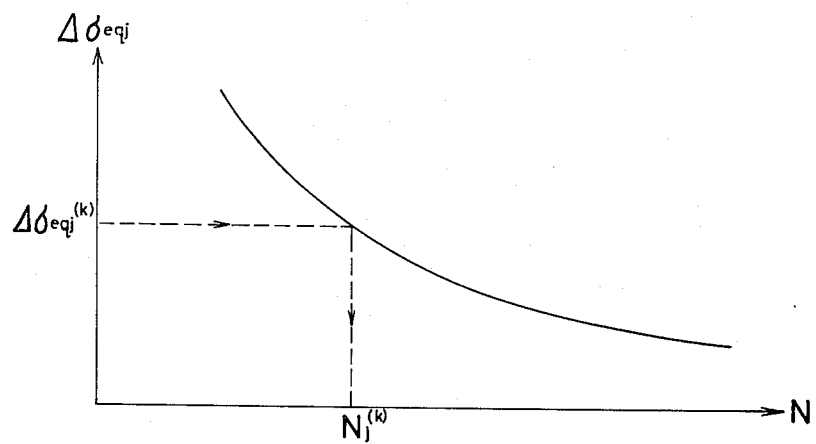
FIG. 3 is an S-N (stress amplitude-fatigue repetition number) diagram.

The vibration mode type $g_i(x)$ has a waveform as shown in FIG. 1 and, therefore, when $i \to \infty$, $||g_i(x)|| \approx 0$. On the other hand, the differential equation represented by the i-th vibration mode component $h_i(t)$ becomes as follows:

$$m_i h''_i(t) + c_i h'_i(t) + k_i h_i(t) = \phi_i f(t) \tag{3}$$

where $m_i$ is the i-th effective mass, $c_i$ is the i-th effective attenuation, $k_i$ is the i-th spring constant and $\phi_i$ is the i-th effective external coefficient.

Therefore, by putting $h'_i(o)=0$ and $h_i(o)=0$, the Laplace transformation of the equation (3) becomes as follows:

$$(m_i S^2 + c_i S + k_i) \cdot H_i(S) = \phi_i F(S) \tag{4}$$

Further, by using a relation
$$G_i(S) = \phi_i/(m_i S^2 + C_i S + k_i) \tag{4'}$$

the equation (4) can be represented as follow:

$$H_i(S) = G_i(S) \cdot F(S) \tag{5}$$

The function $G_i(S)$ is referred to as the transfer function.

On the other hand, since the equation (2) is a linear function, it can be represented by using the equation (5) as follow:

$$Y(x,t) = \Sigma g_i(x) \cdot H_i(t) \tag{6}$$
$$= \Sigma g_i(x) \cdot G_i(S) \cdot F(S)$$

Therefore, torsional vibrations at a certain position $x_p$ and an arbitrary position $x_A$ of the rotating shaft system Z can be represented, respectively, as follows:

$$Y(x_p,t) = \Sigma g_i(x_p) \cdot G_i(S) \cdot F(S) \tag{7}$$

$$Y(x_A,t) = \Sigma g_i(x_A) \cdot G_i(S) \cdot F(S) \tag{7'}$$

Accordingly, $$Y(x_A,t) = [(\Sigma g_i(x_A) \cdot G_i(S))/(\Sigma g_i(x_p) \cdot G_i(S))] \cdot Y(x_p,S) \quad (8)$$
$$= G_A(S) \cdot Y(x_p,S) \quad (9)$$

The function $G_A(S)$ in the equation (9) is the transfer function and the function $G_i(S)$ in the equation (8) is obtained from the equation (4). The functions $g_i(x_A)$ and $g_i(x_p)$ are previously known as shown in FIG. 1 and are determined by the coordinates of the certain position $x_p$ and the arbitrary position $x_A$ of the rotating shaft system.

In other words, the equation (9) indicates that the torsional vibration at the certain position $x_p$ can be transformed into the torsional vibration at the arbitrary position $x_A$ by the transfer function determined primarily by the arbitrary position $x_A$.

Therefore, it is possible to estimate the torsional vibration at an arbitrary monitoring position by selecting a certain position of the rotating shaft system Z at which the torsional vibration can be detected, the coordinate being $x_p$, and the arbitrary position at which the torsional vibration is to be monitored, the coordinate being $x_j$, providing a detector for transient torsional vibration at the certain position $x_p$ and preparing an operation unit having the transfer function represented by the following equation:

$$G_j(S) = (\Sigma g_i(x_j) \cdot (m_i S^2 + c_i S + k_i))/(\Sigma g_i(x_p) \cdot (m_i S^2 + c_i S + k_i)) \quad (10)$$

An embodiment of the present invention will be described with reference to the drawings.

It should be noted that the embodiment is constructed such that it provides not only the estimation of the torsional vibration at the arbitrary position but also the estimation of the fatigue life expenditure of the arbitrary position of the rotating shaft system.

Furthermore, where a huge external force is exerted on a rotating shaft system due to an overload such as caused by thunder and a huge vibration is produced therein, it may be somewhat difficult to consider the torsional vibration produced thereby as an accumulation of products of vibration mode types and the vibration mode components. In view of this consideration, the embodiment is also constructed such that it can record data of the huge vibration for later uses in estimating torsional vibration and fatigue life by a high precision analysis while considering non-linear theory and plastic deformation theory and in obtaining materials as to the frequency of the external forces exerted on the system, the kinds of torsional vibration caused thereby etc. which may be necessary to maintain and/or designing the rotating shaft system.

Besides the above, a method of estimating the fatigue life is first described briefly. A stress due to the torsional vibration produced in a rotating shaft system is proportional to amplitude of the vibration and therefore it can be represented as $$\sigma_j = \alpha_j \cdot Y(x_j,t) \quad (11)$$

where $\alpha_j$ is a proportional constant at the arbitrary position $x_j$ and $Y(x_j,t)$ is the torsional vibration.

With the stress $\sigma_j$ determined as above, it is possible to calculate the fatigue life at the arbitrary position $x_j$ on the basis of the known fatigue life estimation method using the S-N diagram (stress amplitude—fatigue repetition number chart) of material. In the embodiment, it is performed by using the Range-pair counting method.

In the Range-pair counting method, it is assumed that a stress at the arbitrary position $x_j$ such as shown in FIG. 2C is obtained according to the equation (11). Representing extremes of the equation (11) by $\sigma_j^{(1)}$, $\sigma_j^{(2)}$, in the order of time, an amplitude difference or variation stress $\Delta\sigma_j^{(k)}$ of the stress waveform between the $k$-th extreme and the $(k+1)$th extreme and a mean stress $\overline{\sigma}_j^{(k)}$ are represented by $$\Delta\sigma_j^{(k)} = \tfrac{1}{2} |\sigma_j^{(k)} - \sigma_j^{(k+1)}| \quad (12)$$

$$\overline{\sigma}_j^{(k)} = \tfrac{1}{2} |\sigma_j^{(k)} + \sigma_j^{(k+1)}| \quad (13)$$

respectively. An equivalent amplitude difference $\Delta\sigma_{eqj}^{(k)}$ equivalent to a case of the mean stress being zero can be represented according to the modified Goodman chart as $$\Delta\sigma_{eqj}^{(k)} = \sigma_j^B \Delta\sigma_j^{(k)}/(\overline{\sigma}_j^B - \overline{\sigma}_j^{(k)}) \quad (14)$$

where $\sigma_j^B$ is a tension strength of the rotating shaft. By using the equivalent variation stress $\Delta\sigma_{eqj}^{(k)}$ as determined by the equation (14), the repetition number $N_j^{(k)}$ of repetitive applications of the equivalent variation stress $\sigma_{eqj}^{(k)}$ to the arbitrary position until the latter is broken can be determined.

On the other hand, the life expenditure $\Delta D_j^{(k)}$ due to the change of the stress extreme from $\sigma_j^{(k)}$ to $\sigma_j^{(k+1)}$ is represented by $$\Delta D_j^{(k)} = 1/(2 \cdot N_j^{(k)}) \quad (15)$$

assuming the stress change corresponds to a half of the stress wave cycle.

Therefore, it is possible to obtain the life expenditure $D_j$ until the time before which $(n+1)$ stress extremes are applied to the arbitrary position $x_j$ of the rotating shaft system by operating the variation stress at the arbitrary position $x_j$ according to the equation (11), counting the extremes of the stress and calculating and accumulating the life expenditure $\Delta D_j^{(k)}$ by using the counted number and the equations (12) to (15). That is, the expenditure can be represented by $$D_j = \sum_{k=1}^{n} \Delta D_j^{(k)} = \sum_{k=1}^{n} 1/(2N_j^{(k)}) \quad (16)$$

Figure 4:
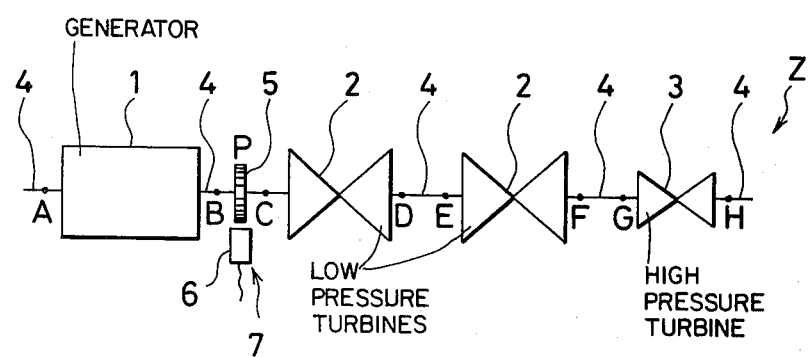
FIG. 4 is a schematic illustration of an apparatus according to the present invention, when applied to a turbine generator.

Referring to FIG. 4, a reference numeral 1 is a generator 1 is driven by low pressure turbines 2 and a high pressure turbine 3. Rotating shafts 4 connect the turbines 2 and 3 and are arranged in series to form a rotating shaft system Z. A turning gear 5 is mounted on the rotating shaft 4 at a certain position P (coordinate being $x_p$) of the shaft 4. A reference numeral 6 is a pickup 6 detects torsional vibration of the rotating shaft 4 and, together with the turning gear 5, forms detector 7. The certain position P may be set at any point on the rotating shaft 4 and a plurality of such certain position may be set to improve the precision and reliability of measurement.

Reference letters A, . . . , H shown on the rotating shaft 4 in FIG. 4 indicate arbitrary positions at which torsional vibrations are to be monitored, the coordinates of the positions A, . . . , H being represented by $x_A, \ldots, x_H$, respectively. The setting of the above monitoring positions, i.e., the settings of the coordinates thereof can be made arbitrarily.

Referring to FIG. 5, an operator 8 has a transfer characteristic represented by the equation (10) by which the torsional vibrations at the arbitrary positions A to H are estimated from the certain position P. It should be noted that "i" in the equation (10) of the order of 10 may be sufficient for this purpose.

In this manner, the torsional vibrations $Y(x_p,t)$ detected by the detector 7 at the certain position P and shown in FIG. 2A are converted by the respective operators 8 into the torsional vibrations $Y(x_j,t)$ to be monitored at the arbitrary positions j, the vibrations $Y(x_j,t)$ being shown in FIG. 2B. Multiply proportional constants $\alpha_j$ by the torsional vibrations $Y(x_j,t)$ obtained by the operators 8 to obtain stress waveforms $\sigma_j$ shown in FIG. 2C.

Therefore, it is possible, by using an operation circuit comprising extreme value detectors 10 for detecting the extreme values $\sigma_j^{(k)}(k=1, 2, \ldots)$ of the stress waves $\sigma_j$ and a switching device (11) for combining data from the extreme value detectors 10 to supply the resultant output of the switching device (11) to a computer 12 so that the latter can perform a computing and estimating operation of the life expenditure at the respective arbitrary positions A to H which are represented by the equations (12) to (16), to calculate the fatigue life.

Life expenditure indicators 13 and 14 indicate the life expenditures at the respective positions as calculated by the computer 12 and a recorder for recording the life expenditures, respectively, by which it is possible to know that the life expenditure $D_j$ at the position j is 1, i.e., the life is consumed completely. An external force detector 15 detects an external force exerted on the rotating shaft system Z due to an overload such as thunder. A delay circuit 16 serves for correcting a time interval from a start of the recorder 19 to a time at which the rotation of the rotating shaft system is regulated to a normal state and a recording becomes ready. A set voltage generator 17 serves for generating a voltage related to the stress setting value $\sigma_s$ and a comparator 18 compares the set value $\sigma_s$ with the stress $\sigma_j$ at the arbitrary position obtained by the multiplier 9 to start the operation of the recorder 19 when $\sigma_s < \sigma_j$.

The recorder 19 records outputs of the external force detector 15 and the detector 7. Therefore, the recorder 19 records the torsional vibration $Y(x_p,t)$ at the certain position P and the external force produced thereat in the rotating shaft system when the stress at the arbitrary position j is too large.

As described, in the embodiment of the present invention, the torsional vibration produced in the rotating shaft 4 is detected by the detector 7 provided at the certain position P, the torsional vibration $Y(x_j,t)$ at each of the arbitrary position j by operating the detected value in the operator 8 and the stress at each of the positions j is calculated by the multipliers 9. The stress is processed in the fatigue operation circuit and thus the fatigue life expenditure of the arbitrary position j is computed. That is, since, in the present invention, the monitoring of the arbitrary position is performed by not obtaining the stress by a provision of a plurality of the pickups at the monitoring positions on the rotating shaft system Z, but monitoring only the certain position and estimating the stresses at the arbitrary positions from the result of the certain position monitoring, there is no physical limitation in the positions at which the monitorings are desired.

Furthermore, in a case where a stress whose magnitude exceeds the set value, i.e., a vibration the linear decomposition of which is undesirable for the purpose of the estimation occurs, the real vibration at the position P is recorded by means of the combination of the external force detector 15, the comparator 16 and the recorder 19 and, simultaneously, the external force produced in the rotating shaft system is recorded so that these data can be used later and analysed by a large computer. Further, economy is achieved since there is no need of recording all data for a long period of time.

What is claimed is:

1. A torsional vibration monitoring apparatus for a rotating shaft system in which the torsional vibration of the rotating shaft system is monitored by estimating torsional vibration at arbitrary positions $x_j$ of the rotating shaft system from torsional vibration detected at a certain position $x_p$ of the rotating shaft system on the basis of the facts that a torsional vibration $Y(x,t)$ produced in a rotating shaft system is an accumulation of modal vibrations $Y_i(x,t)$ and that each modal vibration is a product of a vibration mode type $g_i(x)$ and a vibration mode component $h_i(t)$, comprising a detector for detecting the torsional vibration at the certain position $x_p$ of the rotating shaft system and an operator having a transfer characteristic for converting the torsional vibration detected at the certain position $x_p$ into the torsional vibration at the arbitrary position $x_j$ of the rotating shaft system.

2. A torsional vibration monitoring apparatus as claimed in claim 1, wherein said operator has the transfer characteristics $$G_j(S) = (\Sigma g_i(x_j) \cdot (m_i S^2 + c_i S + k_i)) / (\Sigma g_i(x_p) \cdot (m_i S^2 + c_i S + k_i))$$

where $m_i$ is an i-th effective mass, $c_i$ is an i-th effective attenuation, $k_i$ is an i-th spring constant and $g_i$ is an i-th effective external coefficient.

3. A torsional vibration monitoring apparatus as claimed in claim 1, further comprising a fatigue operation circuit including extreme value detectors for detecting extreme values $\sigma_j^{(k)}(k=1, 2, \ldots)$ of a stress at the arbitrary position $x_j$ which are outputs of said operator, a switching device for combining outputs of said extreme value detecters and a computer for computing and estimating a fatigue life expenditure at the arbitrary position $x_j$ of the rotating shaft system.

* * * * *